(12) United States Patent
Zeng

(10) Patent No.: US 11,578,988 B2
(45) Date of Patent: Feb. 14, 2023

(54) MAP DISPLAY METHOD, DEVICE, STORAGE MEDIUM AND TERMINAL

(71) Applicant: Tencent Technology (Shenzhen) Company Limited, Shenzhen (CN)

(72) Inventor: Chao Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 441 days.

(21) Appl. No.: 16/781,817

(22) Filed: Feb. 4, 2020

(65) Prior Publication Data

US 2020/0173804 A1    Jun. 4, 2020

Related U.S. Application Data

(63) Continuation of application No. PCT/CN2018/087683, filed on May 21, 2018.

(30) Foreign Application Priority Data

Aug. 25, 2017 (CN) .......................... 201710740562.3

(51) Int. Cl.
*G01C 21/36* (2006.01)
*G06T 19/00* (2011.01)
(Continued)

(52) U.S. Cl.
CPC ............ *G01C 21/367* (2013.01); *B60K 35/00* (2013.01); *G01C 21/3602* (2013.01);
(Continued)

(58) Field of Classification Search
None
See application file for complete search history.

(56) References Cited

U.S. PATENT DOCUMENTS 9,031,782 B1    5/2015  Lemay et al.
2011/0153198 A1*  6/2011  Kokkas .............. G01C 21/3647
                                                              701/533
(Continued)

FOREIGN PATENT DOCUMENTS

CN        102980570 A      3/2013
CN        103335657 A      10/2013
(Continued)

OTHER PUBLICATIONS

Extended European Search Report, EP18848064.4, dated Mar. 31, 2021, 14 pgs.
(Continued)

*Primary Examiner* — David H Chu
(74) *Attorney, Agent, or Firm* — Morgan, Lewis & Bockius LLP

(57) ABSTRACT

The present disclosure discloses a map display method performed at a terminal. The method includes: obtaining a real scene image of a current location and target navigation data of navigation from the current location to a destination; determining, according to the current location and the target navigation data, virtual navigation prompt information to be overlaid in the real scene image; determining, according to a device configuration parameter of a target device capturing the real scene image, a first location on which the virtual navigation prompt information is overlaid in the real scene image; performing verification detection on the current device configuration parameter; and overlaying the virtual navigation prompt information on the first location when the current device configuration parameter passes through the verification detection. According to the present disclosure, an AR technology is applied to the navigation field so that map display manners are more diverse and diversified.

20 Claims, 6 Drawing Sheets

(51) Int. Cl.
  *G01C 21/00* (2006.01)
  *G06T 7/80* (2017.01)
  *G06T 7/50* (2017.01)
  *G06T 7/70* (2017.01)
  *B60K 35/00* (2006.01)

(52) U.S. Cl.
  CPC ............ *G01C 21/3896* (2020.08); *G06T 7/50* (2017.01); *G06T 7/70* (2017.01); *G06T 7/80* (2017.01); *G06T 19/006* (2013.01); *B60K 2370/166* (2019.05); *B60K 2370/177* (2019.05); *B60K 2370/186* (2019.05); *B60K 2370/90* (2019.05); *G06T 2207/30244* (2013.01); *G06T 2207/30256* (2013.01)

(56) References Cited

U.S. PATENT DOCUMENTS

| | | | | |
|---|---|---|---|---|
| 2012/0281873 | A1* | 11/2012 | Brown | G06T 13/20 382/103 |
| 2015/0204687 | A1* | 7/2015 | Yoon | G06T 19/006 701/436 |
| 2015/0279050 | A1* | 10/2015 | Yang | G02B 27/017 345/633 |
| 2015/0317057 | A1* | 11/2015 | Choi | G01C 21/3673 715/757 |
| 2016/0012643 | A1* | 1/2016 | Kezele | H04N 13/156 345/633 |
| 2017/0039856 | A1* | 2/2017 | Park | B60K 35/00 |
| 2017/0343374 | A1* | 11/2017 | Yi | G06V 20/588 |
| 2018/0066956 | A1* | 3/2018 | Kim | G06T 19/006 |
| 2018/0328752 | A1* | 11/2018 | Tomatsu | G02B 27/01 |
| 2021/0107356 | A1* | 4/2021 | Watanabe | B60K 35/00 |

FOREIGN PATENT DOCUMENTS

| | | |
|---|---|---|
| CN | 104520675 A | 4/2015 |
| CN | 105335969 A | 2/2016 |
| CN | 106996795 A | 8/2017 |
| WO | WO 2013/086475 A1 | 6/2013 |
| WO | WO 2016/132113 A1 | 8/2016 |

OTHER PUBLICATIONS

Abdi Lotfi et al., "In-Vehicle Augmented Reality Traffic Information System: A New Type of Communication Between Driver and Vehicle", Procedia Computer Science, vol. 73, 2015, pp. 242-249, XP029371282, ISSN: 1877-0509.

Wolfgang Narzt et al., "Augmented Reality Navigation Systems", Universal Access in The Information Society, International Journal, Springer, Berlin, DE, vol. 4, No. 3, Dec. 21, 2005, pp. 177-187, XP019356825, ISSN: 1615-5297.

Tencent Technology, ISRWO, PCT/CN2018/087683, dated Aug. 28, 2018, 6 pgs.

Tencent Technology, IPRP, PCT/CN2018/087683, dated Feb. 25, 2020, 5 pgs.

Wolfgang Narzt et al., "Augmented Reality Navigation Systems", Universal Access in the Information Society, Dec. 21, 2005, 11 pgs.

\* cited by examiner

Distance between two points on a plane

Normal distance from a point to a curve on a plane

MAP DISPLAY METHOD, DEVICE, STORAGE MEDIUM AND TERMINAL

CROSS-REFERENCE TO RELATED APPLICATIONS

This application is a continuation application of PCT/CN2018/087683, entitled "MAP DISPLAY METHOD, APPARATUS, STORAGE MEDIUM AND TERMINAL" filed on May 21, 2018, which claims priority to Chinese Patent Application No. 201710740562.3, entitled "MAP DISPLAY METHOD, APPARATUS, STORAGE MEDIUM AND TERMINAL" filed with the Chinese Patent Office on Aug. 25, 2017, all of which are incorporated by reference in their entirety.

FIELD OF THE TECHNOLOGY

The present disclosure relates to the field of Internet technologies, and in particular, to a map display technology.

BACKGROUND OF THE DISCLOSURE

With gradual advances of sciences and technologies, various new application products that can currently provide convenient services to daily life of people are continuously brought forth from old application products. For example, a map application is one of them. The map application can provide users with a plurality of services such as map browsing, address query, point of interest search, public transportation transfer, driving navigation, walking navigation, public transportation line query and station query, and therefore is quickly popularized in the crowd.

Using driving navigation as an example, referring to FIG. 1, when map display is performed currently, in addition to displaying, in real time based on a current location point of a vehicle, planar road network information related to a surrounding environment, a navigation path from the current location point to a destination is usually further given as a navigation prompt.

In the implementation process of the present disclosure, the inventor finds that the related art has at least the following problems:

When map display is performed, only the road network information and the navigation path that are of a planar form are displayed. Consequently, the display manner is relatively undiversified, and is lacking in diversity.

SUMMARY

To resolve a related technical problem, embodiments of the present disclosure provide a map display method, an apparatus, a storage medium and a terminal. The technical solutions are as follows:

According to a first aspect, a map display method is applied to a terminal having one or more processors and memory storing a plurality of programs to be executed by the one or more processors, the method comprising:

obtaining a real scene image of a current location and target navigation data of navigation from the current location to a destination;

determining, according to the current location and the target navigation data, virtual navigation prompt information to be overlaid in the real scene image;

determining, according to a current device configuration parameter of a target device capturing the real scene image, a first location on which the virtual navigation prompt information is overlaid in the real scene image;

performing verification detection on the current device configuration parameter of the target device using the real scene image; and overlaying the virtual navigation prompt information on the first location in a case that the current device configuration parameter of the target device passes through the verification detection, to obtain an augmented reality image used for performing map display.

According to a second aspect, a terminal comprises one or more processors, memory coupled to the one or more processors and a plurality of programs stored in the memory that, when executed by the one or more processors, cause the terminal to perform the aforementioned map display method.

According to a third aspect, a non-transitory computer-readable storage medium is provided. The storage medium stores a plurality of machine readable instructions in connection with a terminal having one or more processors. The plurality of machine readable instructions, when executed by the one or more processors, cause the terminal to implement the map display method according to the first aspect.

The technical solutions provided in the embodiments of the present disclosure have the following beneficial effects:

In the embodiments of the present disclosure, an AR technology is applied to the navigation field. A navigation manner of combining a virtual scene and a real scene is implemented, so that map display manners are more diverse and diversified. Moreover, when virtual navigation prompt information is overlaid in a real scene image, verification detection is further performed on a current device configuration parameter in the embodiments of the present disclosure. The virtual navigation prompt information is overlaid in the real scene image only when the device configuration parameter passes through the verification detection, to greatly improve a probability that the virtual navigation prompt information is displayed on a correct location, so that the real scene is more consistent with navigation prompt information, to improve navigation precision.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show merely some embodiments of the present disclosure, and a person of ordinary skill in the technology may still derive other drawings from these accompanying drawings without creative efforts.

DESCRIPTION OF EMBODIMENTS

Figure 1:
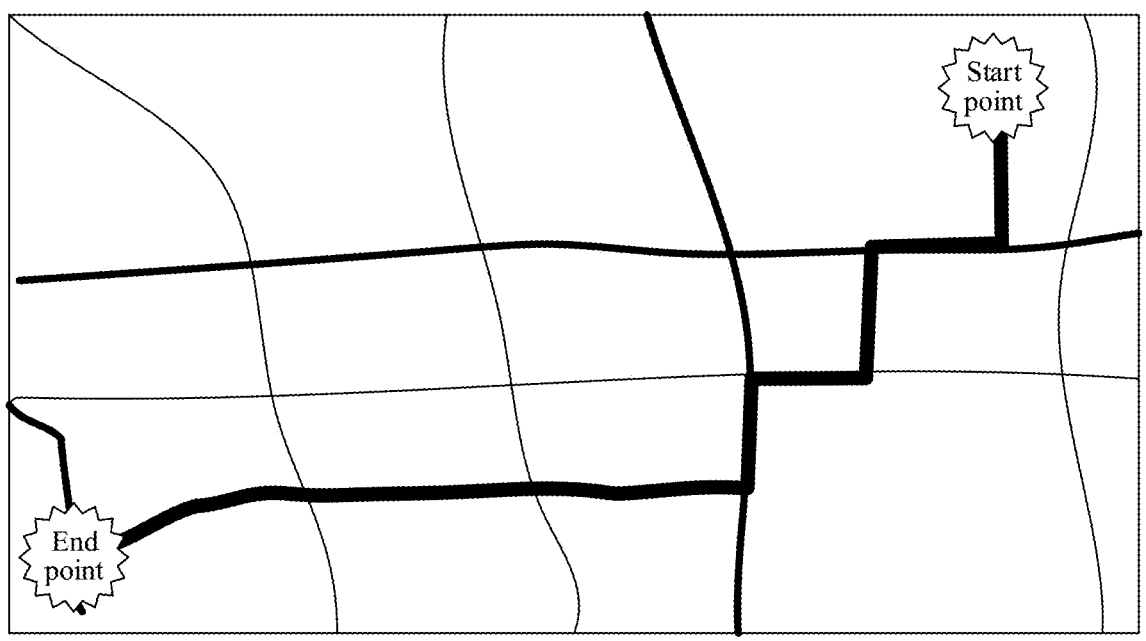
FIG. 1 is a schematic diagram of a type of map display according to the background technology of the present disclosure.

To make the objectives, technical solutions, and advantages of the present disclosure clearer, the following further describes implementations of the present disclosure in detail with reference to the accompanying drawings.

Before the embodiments of the present disclosure are explained and described in detail, some terms in the embodiments of the present disclosure are explained and described.

Augmented Reality (AR) technology: it is a technology that augments perception of a user on a real world through virtual information provided by a computer system. That is, through the AR technology, the virtual information can be applied to the real world, and a virtual object, a virtual scene or system prompt information generated by the computer is overlaid onto a real scene, thereby augmenting reality.

In other words, an objective of this technology is to embed a virtual world into a reality world on a screen and perform interaction. Additionally, the real scene and the virtual information are overlaid onto a same picture in real time. Therefore, after the picture is perceived by a human sense organ, a sensual experience beyond reality may be achieved.

Extrinsic parameter (external parameter): using an example in which a photographing device is a camera, the extrinsic parameter determines a location and a gesture of the camera in a world coordinate system. That is, the extrinsic parameter defines a rule through which the world coordinate system is converted into a camera coordinate system.

Using an example in which $P_w$ refers to a three-dimensional point in the world coordinate system and $P_c$ refers to a three-dimensional point obtained when this three-dimensional point is projected onto the camera coordinate system, a relationship between the two may be described as:

$$P_C = R \cdot P_W + T \quad (1)$$

where R refers to a rotation matrix that is used for representing a rotation conversion operation of the camera and usually has a size of 3*3; and T refers to a translation matrix that is used for representing a translation conversion operation of the camera and usually has a size of 3*1.

Intrinsic parameter (internal parameter): likewise using an example in which a photographing device is a camera, the intrinsic parameter is related to only internal structures of the camera that include a focal length, a distortion parameter and the like of the camera. The intrinsic parameter determines a rule through which the camera coordinate system is converted into an image coordinate system. In the embodiments of the present disclosure, the extrinsic parameter and the intrinsic parameter of the camera are collectively referred to as the device configuration parameter.

The intrinsic parameter and the extrinsic parameter may be uniformly represented by using a projection matrix M. For example, a projection formula of projecting a three-dimensional point in the world coordinate system onto the two-dimensional image coordinate system is as follows:

$$(x,y) = M(X,Y,Z) \quad (2)$$

where (X,Y,Z) is a three-dimensional coordinate value of this point in the world coordinate system, and (x,y) is a two-dimensional coordinate value of this point in the image coordinate system. M=K[R|T], where an extrinsic parameter and an intrinsic parameter are mixed, and the size is 3*4, where K is an intrinsic parameter matrix. In the embodiments of the present disclosure, a point in a three-dimensional space is projected onto an image space through the projection matrix.

Intrinsic and extrinsic parameter calibration: it is a process of converting the world coordinate system into the image coordinate system. In other words, the intrinsic and extrinsic parameter calibration corresponds to a process of calculating the foregoing projection matrix. Generally, the calibration process is divided into two parts: one part is to convert the world coordinate system into the camera coordinate system, and this step is to convert a three-dimensional point into a three-dimensional point, and is used for calibrating such external parameters of the camera as the rotation matrix R and the translation matrix T; and the other part is to convert the camera coordinate system into the image coordinate system, and this step is to convert a three-dimensional point into a two-dimensional point, and is used for calibrating such an internal parameter of the camera as the intrinsic parameter matrix K.

In the embodiments of the present disclosure, the AR technology is applied to the field of map navigation, to implement AR map navigation in addition to navigation based on a conventional two-dimensional map. Because in this solution, virtual navigation prompt information may be overlaid in a real scene image, a user may achieve a sensual experience beyond reality. This AR navigation technology not only may be applied to a driving scene, but also may be applied to other scenes having a map navigation requirement such as walking. This is not specifically limited in the embodiments of the present disclosure.

A map display method provided in the embodiments of the present disclosure gives an online calibration method for a device configuration parameter, and may periodically perform verification detection on a current device configuration parameter of a target device. Only when a location error between a first location of a real scene image onto which virtual navigation prompt information is projected based on the current device configuration parameter and a second location of a corresponding target object detected in the real scene image is less than a preset threshold, an augmented display of the virtual navigation prompt information is performed, which greatly improves navigation precision. Therefore, navigation prompt information is more matching and consistent with a real-time scene, to avoid a problem such as displaying the virtual navigation prompt information on an incorrect location, or walking into or driving into an incorrect road or an impasse according to insufficiently precise navigation prompt information.

Moreover, in the embodiments of the present disclosure, in addition to projecting virtual navigation prompt information of various target objects occurring in a real scene onto a real scene image to perform augmented display, virtual navigation prompt information having a largest effect on current navigation may be further highlighted. The target objects not only may be various road affiliated facilities such as a speed limit sign, a turn sign, a traffic light, an electronic eye, and a camera, but also may be a lane line, a curb line and the like. This is not specifically limited in the embodiments of the present disclosure.

A system architecture related to the embodiments of the present disclosure is described below with reference to a schematic flowchart of performing an AR navigation method shown in FIG. 2A.

Figure 2A:
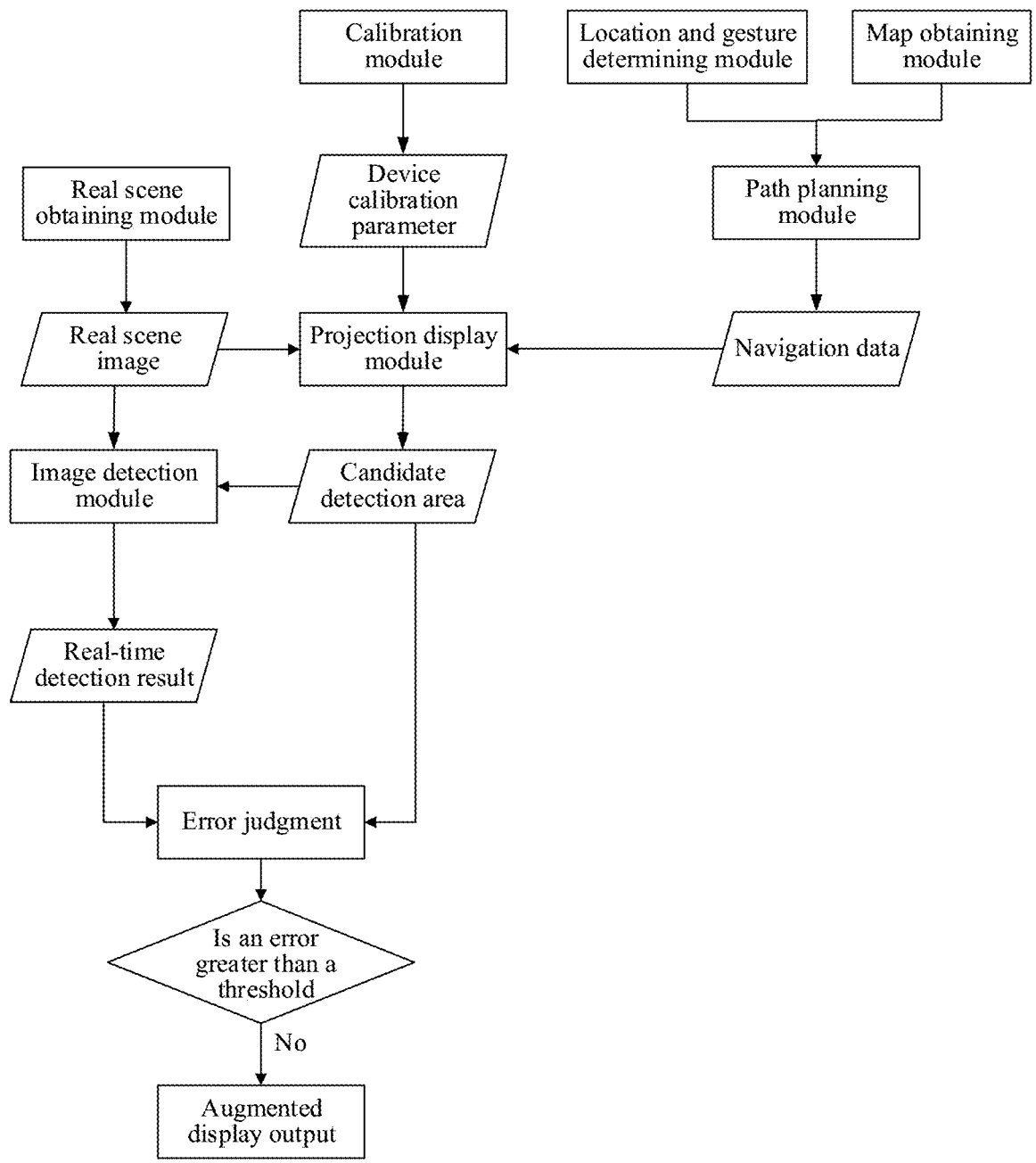
FIG. 2A is a schematic flowchart of performing an AR navigation method according to an embodiment of the present disclosure.

Referring to FIG. 2A, in addition to a real scene obtaining module, a location and gesture determining module, a calibration module, a map obtaining module, a path planning module and a projection display module, function modules related to the map display method provided in the embodiments of the present disclosure further include an image detection module.

The real scene obtaining module is configured to obtain a real scene image related to a real scene, and output the obtained real scene image to the projection display module and the image detection module.

The location and gesture determining module is configured to determine a current location and a gesture of a target object.

The calibration module is configured to calibrate an extrinsic parameter and an intrinsic parameter of a device photographing the real scene, and output a result to the projection display module.

The map obtaining module is configured to obtain, from a server according to the current location and the gesture of the target object, map data that needs to be displayed. The path planning module plans a path for navigation to a destination according to an output of the location and gesture determining module and an output of the map obtaining module, and then obtains target navigation data of navigation to the destination.

The projection display module is configured to overlay virtual navigation prompt information onto the real scene image based on a current device configuration parameter and the target navigation data.

In the embodiments of the present disclosure, the image detection module is configured to periodically perform target object detection in the real scene image based on a candidate detection area outputted by the projection display module. The candidate detection area refers to an image area having the aforementioned first location as a center point, that is, a detection result of the image detection module is actually used for performing verification detection on the device configuration parameter. Only when a location error between the foregoing first location and a second location of a corresponding target object detected in the candidate detection area is less than a preset threshold, an augmented display of the virtual navigation prompt information is performed in the embodiments of the present disclosure.

Figure 2B:
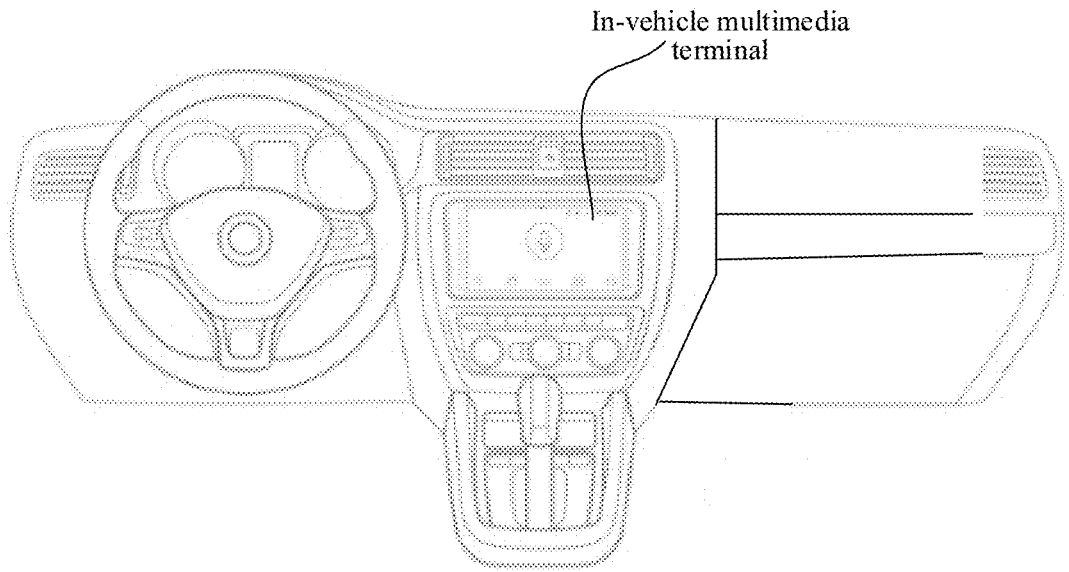
FIG. 2B is a schematic diagram of an in-vehicle multimedia terminal according to an embodiment of the present disclosure.

Using a driving scene as an example, the map display method provided in the embodiments of the present disclosure not only may be applied to an in-vehicle multimedia terminal integrated in a vehicle, but also may be applied to a smart mobile terminal mounted in a vehicle and independent of the vehicle. As shown in FIG. 2B, the in-vehicle multimedia terminal may be a multimedia device disposed on a center console of a vehicle. The in-vehicle multimedia terminal may support functions such as navigation, music play, video play, instant messaging, obtaining a vehicle speed, and receiving/transmitting and parsing a wireless broadcast packet. The wireless broadcast packet may be a Wireless Fidelity (Wi-Fi) packet, a Bluetooth packet or the like. This is not specifically limited in the embodiments of the present disclosure.

Using the foregoing in-vehicle multimedia terminal as an example, the location and gesture determining module, the calibration module, the map obtaining module, the path planning module, the projection display module and the image detection module shown in FIG. 2A may be disposed in the in-vehicle multimedia terminal. If the in-vehicle multimedia terminal does not support image capture, the real scene obtaining module is substantially disposed in a photographing device mounted in the vehicle and establishing a data connection to the in-vehicle multimedia terminal. That is, the in-vehicle multimedia terminal indirectly obtains the real scene image through the photographing device.

Using the foregoing smart mobile terminal as an example, because each of various current smart mobile terminals basically supports an image capture function, each of the real scene obtaining module, the location and gesture determining module, the calibration module, the map obtaining module, the path planning module, the projection display module and the image detection module shown in FIG. 2A may be disposed in the smart mobile terminal.

Figure 3A:
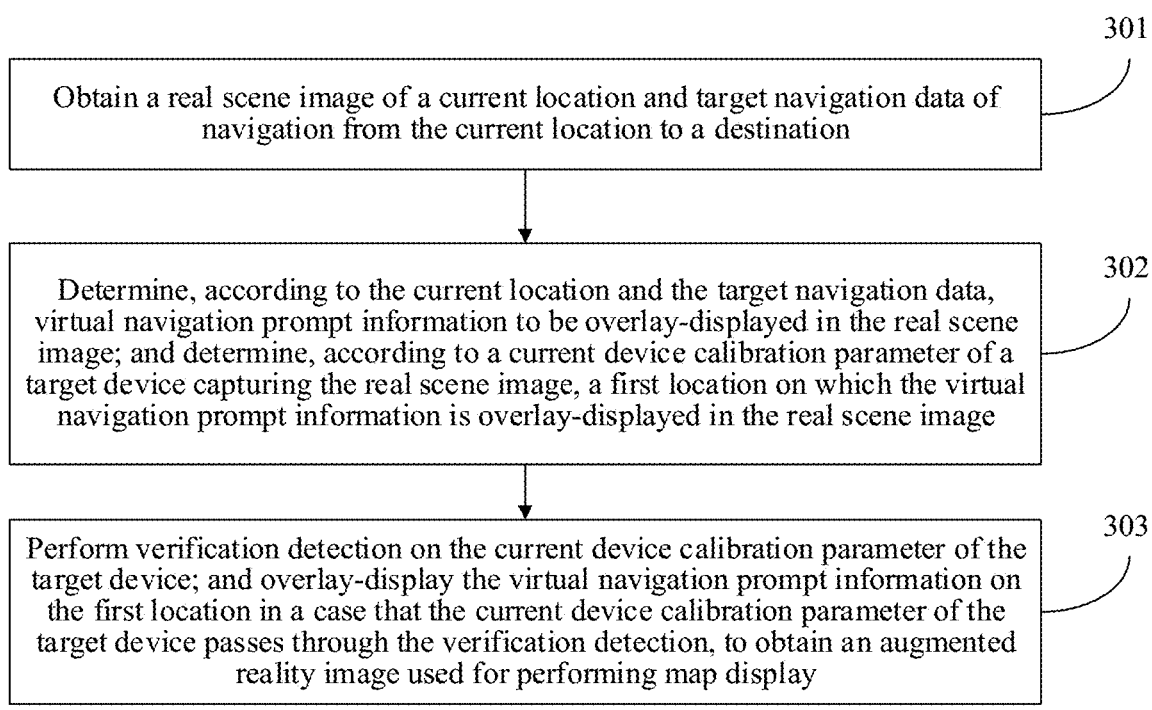
FIG. 3A is a flowchart of a map display method according to an embodiment of the present disclosure.

FIG. 3A is a flowchart of a map display method according to an embodiment of the present disclosure. With reference to a driving scene and the schematic flowchart of performing an AR navigation method shown in FIG. 2A, using an example in which the map display method is performed by the in-vehicle multimedia terminal supporting the image capture function, referring to FIG. 3A, a process of the method provided in this embodiment of the present disclosure includes the following steps:

301. Obtain a real scene image of a current location and target navigation data of navigation from the current location to a destination.

In this embodiment of the present disclosure, the location and gesture determining module in FIG. 2A is configured to determine a current location and a gesture of a vehicle. To be capable of precisely determining a location and a gesture of the vehicle, a simultaneous localization and mapping (SLAM) technology is adopted in this embodiment of the present disclosure. Compared with a location and gesture determining manner of adopting a conventional Global Positioning System (GPS) and a gyroscope, in a location and gesture determining manner based on the SLAM technology, precision is greatly improved.

The target navigation data gives a navigation basis of travelling from the current location to the destination. As shown in FIG. 2A, the target navigation data is determined by the path planning module based on the current location and the gesture of the vehicle outputted by the location and gesture determining module, the map data outputted by the map obtaining module, and destination information inputted by a user. The map data mentioned in this embodiment of the present disclosure is high-precision map data being a next-generation navigation map that has centimeter-level positioning precision and includes road network information, point of interest information, related information about road affiliated facilities (for example, a traffic light, an electronic eye, and a transportation sign) and dynamic traffic information. Not only the user may be informed of a travelling direction and a road condition in the front, but also dynamic traffic information may be transferred to the user in real time, to help the user judge a congestion level in the front and assist in selecting an optimal travelling path.

302. Determine, according to the current location and the target navigation data, virtual navigation prompt information to be overlaid in the real scene image; and determine, according to a device configuration parameter of a target device capturing the real scene image, a first location on which the virtual navigation prompt information is overlaid in the real scene image.

Using an example in which the target device capturing the real scene image is a camera mounted in the vehicle, that is, an in-vehicle camera, the target navigation data covers all navigation data from the current location to the destination, and the real scene image is captured by the in-vehicle camera in real time. Therefore, to determine virtual navigation prompt information that is to be overlaid in the current real scene image captured in real time, virtual navigation prompt information associated with the current location further needs to be first determined according to the target navigation data. For example, if the current location or near target objects including a traffic light, an electronic eye, a transportation sign and the like is determined through the target navigation data, all virtual information related to these target objects may be used as virtual navigation prompt information associated with the current location.

In other words, the virtual navigation prompt information to be overlaid in the real scene image may be virtual information related to the current location or various near road affiliated facilities, virtual information related to a lane line or a curb line on a current travelling road of the vehicle, and the like. This is not specifically limited in the embodiments of the present disclosure.

In this embodiment of the present disclosure, after the virtual navigation prompt information to be overlaid is determined, to display the virtual navigation prompt information on a correct location on a display screen, the first location on which the virtual navigation prompt information is overlaid in the real scene image is further determined according to the device configuration parameter of the camera. The first location herein is a location of a target object in the image coordinate system that is theoretically obtained after the corresponding target object in the world coordinate system is projected onto the image coordinate system through conversion.

A location of each target object in the world coordinate system is known. After the current device configuration parameter of the camera, that is, the aforementioned projection matrix is obtained, the first location on which the virtual navigation prompt information is overlaid in the real scene image may be calculated according to the projection matrix. The device configuration parameter is obtained by the calibration module in FIG. 2A. In this embodiment of the present disclosure, the intrinsic parameter of the device configuration parameter may be calibrated by using a checkerboard calibration method, or an intrinsic parameter value that is set during device delivery may be directly used as the intrinsic parameter. For calibration on the extrinsic parameter of the device configuration parameter, this embodiment of the present disclosure gives an online extrinsic parameter calibration method. The extrinsic parameter calibration method is specifically a hierarchical search method based on a parameter space, and a specific calibration process is as follows:

(a). Set at least two search granularities for the extrinsic parameter.

In this embodiment of the present disclosure, the concept of hierarchical search is to perform coarse-to-fine discrete division on the parameter value search range (which may also be referred to as a parameter space) of the extrinsic parameter, first perform search on a coarse granularity, and then perform search on a finer granularity step by step based on a search result on the coarse granularity. The at least two search granularities are all different from each other. For example, if an angle is rotated and two search granularities are set, one of the search granularities may have a size of 1 degree, and the other of the search granularities may have a size of 0.1 degrees.

(b). Determine discrete search parameter values within the parameter value search range of the extrinsic parameter on a first search granularity whose granularity value is maximum.

The first search granularity is a search granularity whose granularity value is maximum of the at least two search granularities. If the parameter value search range is 0 degrees to 20 degrees, and the first search granularity is 1 degree, discrete search parameter values may be 0 degrees, 1 degree, 2 degrees, 3 degrees, . . . , and 20 degrees.

(c). Calculate a cost function value of each search parameter value within the current parameter value search range, and determine a first search parameter value having a minimum cost function value under the first search granularity.

The core for the extrinsic parameter calibration method is to define a method for calculating a cost function, and in this embodiment of the present disclosure, a Euclidean distance in an image space is used as a method for calculating a cost function value. When a cost function value of each search parameter value is calculated, the cost function value is calculated in the following manners in this embodiment of the present disclosure:

A first manner is specific to a point target object in a real scene image.

The point target object may be a transportation sign such as a traffic light, a turn prompt, or an electronic eye.

Figure 3B:
FIG. 3B is a schematic diagram of a point-to-point distance on a plane according to an embodiment of the present disclosure.

First, a point target object in a real scene image is obtained; and then, a second location, in the real scene image, of virtual navigation prompt information matching the point target object is determined for each search parameter value and according to the search parameter value. As shown in FIG. 3B, a straight-line distance between the second location and a third location of the point target object is calculated, where the straight-line distance is used as a cost function value of the search parameter value.

The third location is a location of the point target object detected in the real scene image.

A second manner is specific to a line target object in a real scene image.

The line target object may be a lane line, a curb line or the like.

Figure 3C:
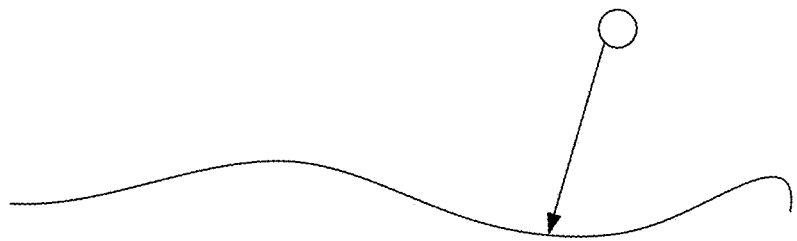
FIG. 3C is a schematic diagram of a point-to-line distance on a plane according to an embodiment of the present disclosure.

First, a line target object in a real scene image is obtained; and then, a fourth location, in the real scene image, of third virtual navigation prompt information matching the line target object is determined for each search parameter value and according to the search parameter value. As shown in FIG. 3C, a normal distance between the fourth location and a fifth location of the line target object is calculated, where the normal distance is used as a cost function value of the search parameter value.

The fifth location is a location of the line target object detected in the real scene image.

To sum up, after a cost function value of each search parameter value under the first search granularity is calculated, the first search parameter value having the minimum cost function value is specifically determined under the first search granularity in this embodiment of the present disclosure, and then search continues to be performed under a finer granularity by using the first search parameter value as an initial value. For details, refer to the following step (d).

(d). Search for a second search parameter value having the minimum cost function value under a second search granularity based on the first search parameter value.

A granularity value of the second search granularity is less than that of the first search granularity and is greater than those of other search granularities.

In an optional implementation, when the search for the second search parameter value having the minimum cost function value is performed under the second search granularity, the search may be implemented with reference to the following manner:

First, a parameter value search range under the second search granularity is determined according to the first search granularity and the first search parameter value.

An example in which the first search granularity is 1 degree continues to be used. If the first search parameter value is 3 degrees, a parameter value search range under the second search granularity may range from 3−1=2 degrees to 3+1=4 degrees.

Then, using the second search granularity as an example, discrete search parameter values are determined within a parameter value search range under the second search granularity, and a cost function value of each search parameter value within the current parameter value search range is calculated in a manner similar to the foregoing manner; and then, a search parameter value having a minimum cost function value under the second search granularity is used as the second search parameter value.

If the second search granularity is 0.1 degrees, and a parameter value search range under the second search granularity ranges from 2 degrees to 4 degrees, discrete search parameter values may be 2.1 degrees, 2.2 degrees, 2.3 degrees, . . . , and 4 degrees.

(e). Perform parameter value search in a parameter value search manner under the second search granularity in descending order of granularity values in remaining search granularities, until a target search parameter value having a minimum cost function value is obtained under a search granularity having a minimum granularity value; and determine the target search parameter value as a current extrinsic parameter of the target device.

In conclusion, for any search granularity, the foregoing extrinsic parameter calibration method is to calculate a cost function value of each search parameter value within a parameter value search range corresponding to the search granularity, so as to determine a search parameter value having a minimum cost function value under the search granularity; then, a parameter value search range corresponding to a next search granularity is determined based on the search parameter value obtained through the current search and in descending order of search granularities, and certainly a granularity value of the next search granularity is less than that of the current search granularity; then, a search parameter value having a minimum cost function value under the next search granularity is still determined in a manner similar to the current search manner; and the rest can be deduced by analogy, and repeated search is performed, until a target search parameter value having a minimum cost function value under a minimum search granularity is obtained.

In other words, in this embodiment of the present disclosure, coarse-to-fine discrete division is performed on the parameter space, and search is first performed under a coarse granularity, to obtain a search parameter value having a minimum cost function value; then the parameter space is refined by using this search parameter value as an initial value, and search is performed once more, to obtain a search parameter value having a minimum cost function value under the current granularity; and cycling is performed accordingly, until a search parameter value having a minimum cost function value under a finest granularity is obtained, and is used as a final configuration parameter value.

After the first location on which the virtual navigation prompt information is overlaid in the real scene image is obtained, in this embodiment of the present disclosure, in addition to immediately overlaying the virtual navigation prompt information according to the calculated first location, verification detection may be further performed on the current device configuration parameter. Only after the current device configuration parameter passes through the verification detection, the virtual navigation prompt information may be overlaid according to the calculated first location, so as to improve precision of overlaying the virtual navigation prompt information. For specific description, refer to the following step 303.

303. Perform verification detection on the current device configuration parameter of the target device; and overlay the virtual navigation prompt information on the first location in a case that the current device configuration parameter of the target device passes through the verification detection, to obtain an augmented reality image used for performing map display.

In an optional implementation, the performing verification detection on the current device configuration parameter mainly includes the following several steps:

303 (a). Perform target object detection in the target image area, in the real scene image, having the first location as the center point in a case that a verification condition for the device configuration parameter is currently satisfied.

In this embodiment of the present disclosure, to reduce the calculation amount, verification detection is not performed each time virtual navigation prompt information is overlaid onto each frame of real scene image, this verification detection on the device configuration parameter may be periodically performed. For example, verification detection may be performed once at an interval time length of 10 s.

If it is determined according to the interval time length that a current moment is a moment at which verification detection is periodically performed, it is determined that a verification condition for the device configuration parameter is currently satisfied, and the projection display module shown in FIG. 2A delimits, based on the foregoing calculated first location, a target image area in the real scene image to serve as the candidate detection area. The target image area has the first location as the center point. Then, in this embodiment of the present disclosure, a target object matching the virtual navigation prompt information is detected in this target image area, so as to judge whether the current device configuration parameter still continues to be available.

303 (b). Determine, if a target object matching the virtual navigation prompt information is detected in the target image area and a location error between a sixth location of the target object and the first location is less than the preset threshold, that the current device configuration parameter passes through the verification detection.

The image detection module in FIG. 2A is responsible for detecting a target object matching the virtual navigation prompt information in the target image area. The image detection module may detect a target object by using a convolutional neural network detection algorithm or a deep learning detection algorithm. This is not specifically limited in the embodiments of the present disclosure. A location of the target object may be determined in the real scene image through the foregoing detection algorithm.

If the location error between the sixth location of the target object in the target image area and the first location is less than the preset threshold, it proves that a difference between the first location theoretically calculated based on the current device configuration parameter and the really detected sixth location is not much. That is, a difference between the foregoing calculated theoretic location and an actual location is quite small, indicating that the current device configuration parameter has relatively good precision, and does not need to be re-calibrated. The determined virtual navigation prompt information may continue to be projected onto the real scene image based on the current device configuration parameter, and then an augmented reality image is obtained. This augmented reality image may be used as a map image, outputted to a display screen and displayed.

In an optional implementation, in this embodiment of the present disclosure, the virtual navigation prompt information may be usually overlaid in the following manners:

First manner. Distinguishably display, in a case that the virtual navigation prompt information is lane line information, a virtual lane line of a current travelling lane and a virtual lane line of another lane on the first location, and mark a travelling range of the current travelling lane.

Figure 4:
FIG. 4 is a schematic diagram of a type of map display according to an embodiment of the present disclosure.

For this manner, an embodiment of the present disclosure provides lane-level navigation. Referring to FIG. 4, in this embodiment of the present disclosure, information about all lane lines on a current travelling road is overlaid in a real scene image. Moreover, if the current travelling road includes a plurality of lanes, to make a user explicitly determine a current travelling lane, a virtual lane line of the current travelling lane and virtual lane lines of other lanes are further distinguishably displayed.

Using FIG. 4 as an example, the current travelling lane includes four lanes in total, where the current travelling lane of a vehicle is the second lane on the left. Therefore, in this embodiment of the present disclosure, a virtual lane line of the second lane on the left is displayed in the first display manner, and virtual lane lines of the other three lanes are displayed in the second display manner. The first display manner may be performing filling in the first color, and the second display manner may be performing filling in the second color. This is not specifically limited in the embodiments of the present disclosure.

Moreover, to further make the user explicitly determine the current travelling lane without entering another lane incorrectly, a travelling range of the current lane may be further overlaid. For example, color filling or marking may be performed, in a single color or single style, on an image area defined by the current travelling lane. For example, in FIG. 4, the travelling range of the current travelling lane is marked in a filling manner of a single yellow color.

Moreover, in addition to the foregoing virtual navigation prompt information, in this embodiment of the present disclosure, indication information of a virtual direction such as indication information of a row of arrows shown in FIG. 4 may be further overlaid on the current travelling road. Moreover, voice navigation may be further synchronously performed. This is not specifically limited in the embodiments of the present disclosure.

Second manner. Display a virtual road affiliated facility mark on the first location if the virtual navigation prompt information is road affiliated facility information.

Figure 5:
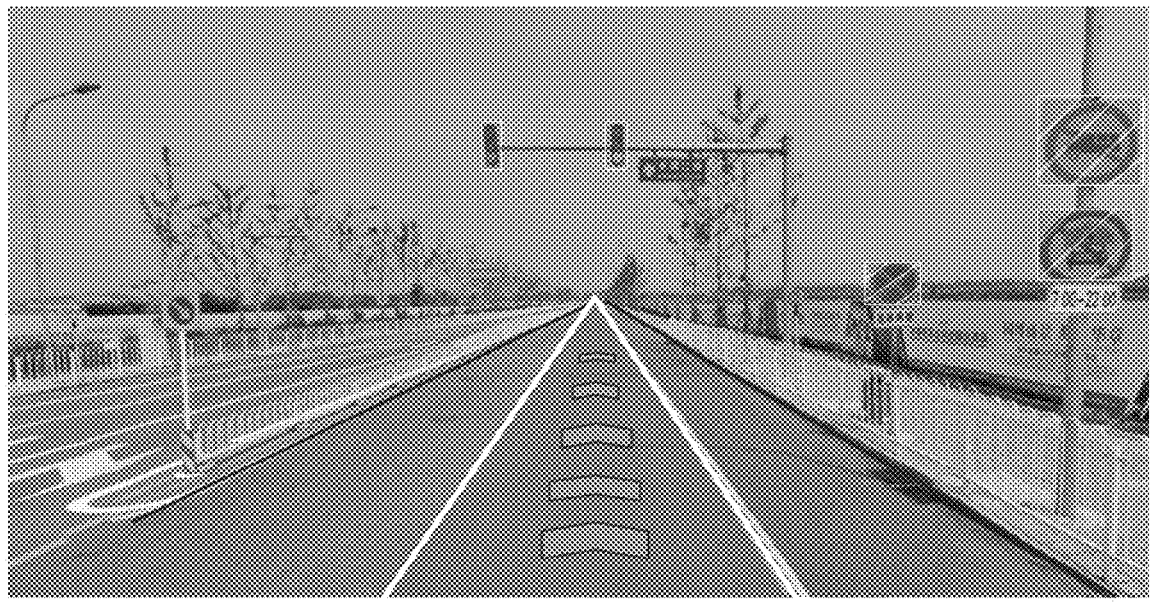
FIG. 5 is a schematic diagram of a type of map display according to an embodiment of the present disclosure.

For this manner, in this embodiment of the present disclosure, various road affiliated facilities on the current travelling road may be further marked. As shown in FIG. 5, the current location includes five road affiliated facilities in total, two of the road affiliated facilities are traffic lights, and the other three road affiliated facilities are transportation signs. For a case in which the virtual navigation prompt information is road affiliated facility information, in this embodiment of the present disclosure, a virtual road affiliated facility mark may be displayed on the first location in the following several manners:

Manner (a). As shown in FIG. 5, virtual frames are displayed on locations of road affiliated facilities (that is, the first location), provided that the virtual frames may include the road affiliated facilities. That is, for this manner, a representation form of the virtual navigation prompt information is respective virtual frames used for highlighting road affiliated facilities. In other words, for the manner (a), the virtual road affiliated facility mark is a virtual frame.

Moreover, for a traffic light, in addition to a virtual frame, the virtual navigation prompt information may further include virtual prompt information used for giving a prompt about a current color state of the traffic light. For example, a piece of virtual text information such as "it is currently red light" is displayed around a frame.

Manner (b). A virtual road affiliated facility is overlaid on a location of each road affiliated facility. In other words, for the manner (b), the virtual road affiliated facility mark is a virtual object matching each road affiliated facility. For example, a virtual traffic light may be generated for each of two traffic lights in FIG. 5, the virtual traffic light may indicate a current color state. For example, if it is currently red light, in the virtual traffic light, red light is highlighted, and yellow light and green light are not highlighted.

A virtual transportation sign is similarly generated for each of the remaining three transportation signs, and is overlaid on a corresponding location.

For a case in which various road affiliated facilities are at relatively long distances from a photographing camera, the manner (b) is evidently better than the manner (a). Because the distances are relatively long, a framing manner of the manner (a) may have a defect that a user cannot clearly see the road affiliated facilities because images of the road affiliated facilities are relatively small, but the manner (b) just resolves this problem.

Third manner. Distinguishably display a virtual lane line of the current travelling lane and a virtual lane line of a target lane-change lane as well as another virtual lane line in a case that the virtual navigation prompt information is lane-change reminding information.

For this manner, in this embodiment of the present disclosure, a lane-change reminder may be further provided to the user. FIG. 4 continues to be used as an example. If a quantity of current travelling vehicles on the first lane on the left is relatively small, lane change may be performed. Therefore, in this embodiment of the present disclosure, a virtual lane line on the second lane on the left, a virtual lane line on the first lane on the left, and remaining virtual lane lines are distinguishably displayed. A manner of performing filling in different colors may be similarly used as a distinguishable display manner. This is not specifically limited in the embodiments of the present disclosure.

Moreover, for the lane-change reminder, in this embodiment of the present disclosure, a voice reminder may be further synchronously provided. That is, on the basis of the foregoing image display, voice reminding information such as "a current lane may be changed from the second lane on the left to the first lane on the left" may be further outputted, so as to provide a more refined lane-change service to the user.

Fourth manner. Display a virtual point of interest mark of the current location on the first location in a case that the virtual navigation prompt information is point of interest information.

Figure 6:
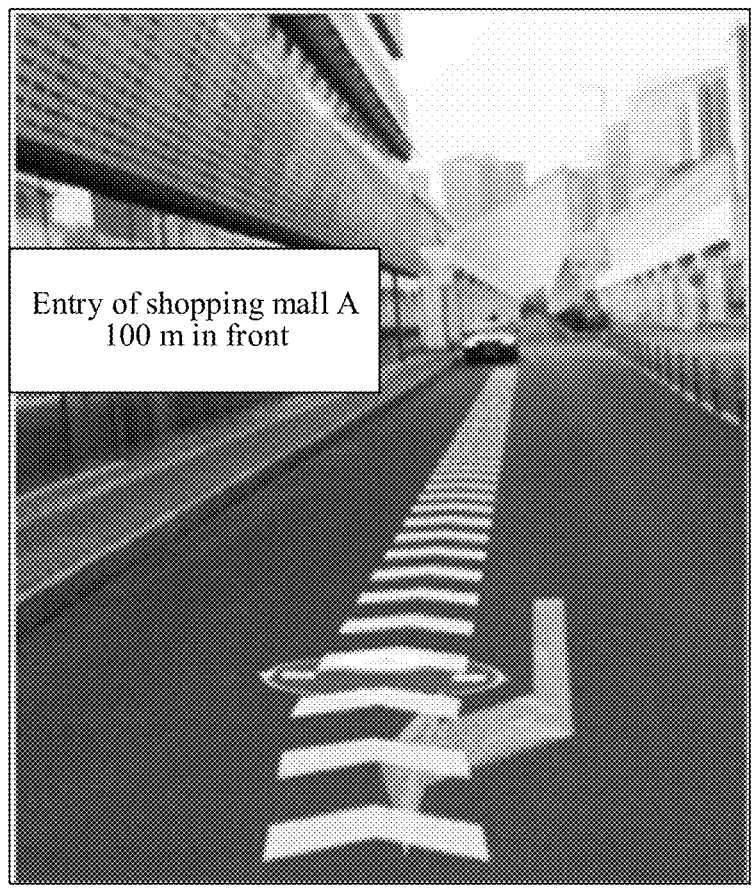
FIG. 6 is a schematic diagram of a type of map display according to an embodiment of the present disclosure.

For this manner, to optimize a navigation experience and improve a user experience degree, point of interest information near the current location may be further displayed in real time based on different locations on which the vehicle is travelling, so as to give a related prompt to the user. The virtual point of interest mark may be displayed in the following several manners:

Manner 1. As shown in FIG. 6, the virtual point of interest mark is specifically virtual text information, and the virtual text information may include name information of a point of interest, information about a distance from the current location of the vehicle and the like. This is not specifically limited in the embodiments of the present disclosure.

Manner 2. The virtual point of interest mark is specifically a virtual object matching the point of interest. For example, if the point of interest is a shopping mall, the virtual object may be a virtual small building; or if the point of interest is a restaurant, the virtual object may be a virtual small dish.

The second manner and the first manner may be used together. For example, the virtual object and the virtual text information are overlaid simultaneously. This is not specifically limited in the embodiments of the present disclosure.

In another embodiment, in this embodiment of the present disclosure, virtual navigation prompt information having a largest effect on current navigation may be further highlighted. That is, if the determined virtual navigation prompt information includes at least two pieces of virtual navigation prompt information, target navigation prompt information having a largest effect on current navigation in the at least two pieces of virtual navigation prompt information is further determined, and the target navigation prompt information is overlaid in a manner different from that for other virtual navigation prompt information.

The target navigation prompt information having a largest effect on current navigation refers to the most important virtual navigation prompt information in the current scene, and usually refers to virtual navigation prompt information of a target object closest to the vehicle. FIG. 5 continues to be used as an example. In five target objects shown in FIG. 5, three transportation signs are closest to the vehicle, and an importance degree of information indicated by these transportation signs in the current scene is greater than that of two far traffic lights. Therefore, target navigation prompt information in FIG. 5 is virtual navigation prompt information of the three transportation signs.

To sum up, the foregoing step 301 to step 304 implement AR navigation, and whenever the vehicle turns or moves so as to cause a change in the field of view of the camera, this embodiment of the present disclosure may ensure that the overlaid virtual navigation prompt information also correspondingly changes accordingly, and the navigation prompt information is displayed on a correct location on the display screen, so that precision of the AR navigation is greatly improved.

The foregoing only gives a processing manner used when the target object matching the virtual navigation prompt information is detected in the target image area and a location error between the sixth location of the target object and the first location is less than the preset threshold, and for a situation other than this situation, this embodiment of the present disclosure similarly gives a processing manner. Details are as follows:

In another embodiment, the device configuration parameter of the target device is re-calibrated if no target object is detected in a target image area, in the real scene image, having the first location as a center point; similar to the foregoing, after the re-calibrated device configuration parameter is obtained, verification detection may also be similarly performed on this re-calibrated device configuration parameter; and the determined virtual navigation prompt information is overlaid in the real scene image of the current location according to the re-calibrated device configuration parameter when the re-calibrated device configuration parameter passes through the verification detection.

For this manner, no target object matching the foregoing virtual navigation prompt information is detected in the target image area. Therefore, it indicates that the current device configuration parameter is inapplicable, and consequently needs to be re-calibrated.

A root cause for triggering re-calibration on the device configuration parameter is that the camera itself may loosen or vibrate because of motion of the vehicle, and consequently the location and the gesture of the camera may change relative to the previous location and gesture. In this case, if the virtual navigation prompt information is still overlaid in the real scene image according to the current device configuration parameter, it is likely that the location is inaccurate, and consequently the device configuration parameter needs to be re-calibrated. A manner of performing re-calibration is consistent with the aforementioned extrinsic parameter calibration method. Details are not described herein again. Moreover, re-calibration on the device configuration parameter only refers to re-calibration on the extrinsic parameter other than the intrinsic parameter.

In another embodiment, this embodiment of the present disclosure further supports collecting statistics on an average value of location errors obtained within a preset time length, where a location error is an error between the first location and a sixth location of a target object detected in a target image area, in the real scene image, having the first location as a center point; the device configuration parameter of the target device is re-calibrated if the obtained average value is greater than a preset threshold; similar to the foregoing, after the re-calibrated device configuration parameter is obtained, verification detection may also be similarly performed on this re-calibrated device configuration parameter; and the determined virtual navigation prompt information is overlaid in the real scene image of the current location according to the re-calibrated device configuration parameter when the re-calibrated device configuration parameter passes through the verification detection.

The preset time length may be 1 s, 2 s or the like. This is not specifically limited in the embodiments of the present disclosure. Using an example in which frames are at an interval of 50 ms, if the preset time length is 1 s, location errors about 20 frames may be obtained. Then, an average value of the location errors about the 20 frames may be calculated, and then subsequent processing is performed based on the calculated average value. For this manner, because comprehensive statistics is collected on situations within a period of time, verification detection on the current device configuration parameter is also more proper and accurate.

In another embodiment, a process of re-calibrating the device configuration parameter of the target device may be triggered if a target object is detected in a target image area, in the real scene image, having the first location as a center point and a location error is greater than a preset threshold; then, similar to the foregoing, verification detection may be performed on this re-calibrated device configuration parameter; and the determined virtual navigation prompt information is overlaid in the real scene image of the current location according to the re-calibrated device configuration parameter when the re-calibrated device configuration parameter passes through the verification detection.

The map display method provided in the embodiments of the present disclosure is explained and described above in detail. When the foregoing map display method is applied to a driving scene, a rich and precise AR navigation manner is provided to the user by using the high-precision map data, the high-precision location and gesture determining manner and the real-time image information in the self-driving technology. On one hand, launching of some core technologies of the self-driving may be facilitated, to form a closed loop from research & development to application; on the other hand, this navigation manner in which virtual and real scenes are fused can further motivate exploration desires and use enthusiasm of users, and increase navigation pleasures, thereby improving navigation utilization.

According to the method provided in this embodiment of the present disclosure, an AR technology is applied to the navigation field. A navigation manner of combining a virtual scene and a real scene is implemented, so that map display manners are more diverse and diversified. Moreover, when virtual navigation prompt information is overlaid in a real scene image, verification detection is further performed on a current device configuration parameter when a condition of performing verification on the device configuration parameter is satisfied in this embodiment of the present disclosure. The virtual navigation prompt information is overlaid in the real scene image only when the device configuration parameter passes through the verification detection, to greatly improve a probability that the virtual navigation prompt information is displayed on a correct location, so that the real scene is more consistent with navigation prompt information, to improve navigation precision.

Additionally, when the current device configuration parameter does not pass through the verification detection, this embodiment of the present disclosure further proposes an extrinsic parameter calibration method having relatively good robust performance to re-calibrate the device configuration parameter, and the virtual navigation prompt information is overlaid based on the re-calibrated device configuration parameter in a subsequent process, to further ensure navigation precision.

Additionally, in this embodiment of the present disclosure, when map display is performed, navigation at a lane line level may be further performed based on the virtual navigation prompt information, so that navigation is more refined, and navigation experience of the user may be greatly improved; and a virtual navigation prompt message having a largest effect on current navigation may be further highlighted, and an augmented display of a lane-change reminder, a near point of interest and the like in the real scene image is performed, thereby achieving richer and more refined functions.

Figure 7:
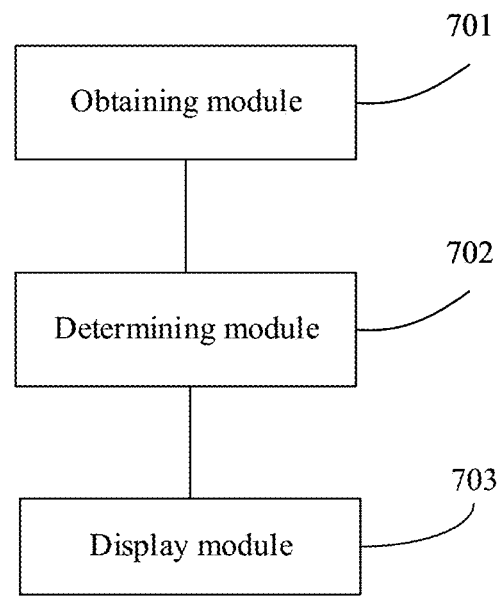
FIG. 7 is a schematic structural diagram of a map display apparatus according to an embodiment of the present disclosure.

FIG. 7 is a schematic structural diagram of a map display apparatus according to an embodiment of the present disclosure. Referring to FIG. 7, the apparatus includes:

an obtaining module 701, configured to obtain a real scene image of a current location and target navigation data of navigation from the current location to a destination;

a determining module 702, configured to determine, according to the current location and the target navigation data, virtual navigation prompt information to be overlaid in the real scene image, where the determining module 702 is further configured to determine, according to a device configuration parameter of a target device capturing the real scene image, a first location on which the virtual navigation prompt information is overlaid in the real scene image; and a display module 703, configured to perform verification detection on the current device configuration parameter of the target device; and overlay the virtual navigation prompt information on the first location in a case that the current device configuration parameter of the target device passes through the verification detection, to obtain an augmented reality image used for performing map display.

In another embodiment, the device configuration parameter includes an extrinsic parameter, and the apparatus further includes:

a calibration module, configured to calculate, for a search granularity that is set for the extrinsic parameter, a cost function value of each search parameter value within a parameter value search range corresponding to a current search granularity, and determine a search parameter value having a minimum cost function value under the current search granularity, where the calibration module is further configured to determine, based on the search parameter value obtained through the current search, a parameter value search range corresponding to a next search granularity, determine, according to the current search manner, a search parameter value having a minimum cost function value under the next search granularity, and deduce the rest by analogy, until a target search parameter value having a minimum cost function value under a minimum search granularity is obtained, where a granularity value of the next search granularity is less than that of the current search granularity; and determine the target search parameter value as a current extrinsic parameter of the target device.

In another embodiment, the calibration module is configured to obtain a point target object in a real scene image; determine, for each search parameter value and according to the search parameter value, a second location, in the real scene image, of virtual navigation prompt information matching the point target object; calculate a straight-line distance between the second location and a third location of the point target object, where the third location is a location of the point target object detected in the real scene image; and take the straight-line distance as a cost function value of the search parameter value.

In another embodiment, the calibration module is configured to obtain a line target object in a real scene image; determine, for each search parameter value and according to the search parameter value, a fourth location, in the real scene image, of virtual navigation prompt information matching the line target object; calculate a normal distance between the fourth location and a fifth location of the line target object, where the fifth location is a location of the line target object detected in the real scene image; and take the normal distance as a cost function value of the search parameter value.

In another embodiment, the apparatus further includes:

a calibration module, configured to re-calibrate the device configuration parameter of the target device if no target object is detected in a target image area, in the real scene image, having the first location as a center point; and the display module is further configured to perform verification detection on the re-calibrated device configuration parameter; and overlay the determined virtual navigation prompt information in the real scene image of the current location according to the re-calibrated device configuration parameter when the re-calibrated device configuration parameter passes through the verification detection.

In another embodiment, the apparatus further includes:

a calibration module, configured to collect statistics on an average value of location errors obtained within a preset time length, where a location error is an error between the first location and a sixth location of a target object detected in a target image area, in the real scene image, having the first location as a center point; and re-calibrate the device configuration parameter of the target device if the average value is greater than a preset threshold;

the display module is further configured to perform verification detection on the re-calibrated device configuration parameter; and overlay the determined virtual navigation prompt information in the real scene image of the current location according to the re-calibrated device configuration parameter when the re-calibrated device configuration parameter passes through the verification detection.

In another embodiment, the apparatus further includes:

a calibration module, configured to re-calibrate the device configuration parameter of the target device if a target object is detected in a target image area, in the real scene image, having the first location as a center point and a location error is greater than a preset threshold, where the location error is an error between the first location and a sixth location, in the target image area, of the target object; and the display module is further configured to perform verification detection on the re-calibrated device configuration parameter; and overlay the determined virtual navigation prompt information in the real scene image of the current location according to the current device configuration parameter when the re-calibrated device configuration parameter passes through the verification detection.

In another embodiment, the display module is configured to perform target object detection in the target image area, in the real scene image, having the first location as the center point if a verification condition for the device configuration parameter is currently satisfied; and determine, if a target object matching the virtual navigation prompt information is detected and a location error between a sixth location of the target object and the first location is less than the preset threshold, that the device configuration parameter passes through the verification detection.

In another embodiment, the display module is configured to determine, if the virtual navigation prompt information includes at least two pieces of virtual navigation prompt information, target navigation prompt information having a largest effect on current navigation in the at least two pieces of virtual navigation prompt information; and overlay the target navigation prompt information in a manner different from that for other virtual navigation prompt information.

In another embodiment, the display module is configured to distinguishably display, in a case that the virtual navigation prompt information is lane line information, a virtual lane line of a current travelling lane and a virtual lane line of another lane on the first location, and marking a travelling range of the current travelling lane; or display a virtual road affiliated facility mark on the first location if the virtual navigation prompt information is road affiliated facility information; or distinguishably display a virtual lane line of the current travelling lane and a virtual lane line of a target lane-change lane as well as another virtual lane line in a case that the virtual navigation prompt information is lane-change reminding information; or display a virtual point of interest mark of the current location on the first location in a case that the virtual navigation prompt information is point of interest information.

According to the apparatus provided in this embodiment of the present disclosure, an AR technology is applied to the navigation field. A navigation manner of combining a virtual scene and a real scene is implemented, so that map display manners are more diverse and diversified. Moreover, when virtual navigation prompt information is overlaid in a real scene image, verification detection is further performed on a current device configuration parameter when a condition of performing verification on the device configuration parameter is satisfied in this embodiment of the present disclosure. The virtual navigation prompt information is overlaid in the real scene image only when the device configuration parameter passes through the verification detection, to greatly improve a probability that the virtual navigation prompt information is displayed on a correct location, so that the real scene is more consistent with navigation prompt information, to improve navigation precision.

Additionally, when the current device configuration parameter does not pass through the verification detection, this embodiment of the present disclosure further proposes an extrinsic parameter calibration method having relatively good robust performance to re-calibrate the device configuration parameter, and the virtual navigation prompt information is overlaid based on the re-calibrated device configuration parameter in a subsequent process, to further ensure navigation precision.

Additionally, in this embodiment of the present disclosure, when map display is performed, navigation at a lane line level may be further performed based on the virtual navigation prompt information, so that navigation is more refined, and navigation experience of the user may be greatly improved; and a virtual navigation prompt message having a largest effect on current navigation may be further highlighted, and an augmented display of a lane-change reminder, a near point of interest and the like in the real scene image is performed, thereby achieving richer and more refined functions.

When the map display apparatus according to the foregoing embodiment performs map display, only divisions of the foregoing functional modules are described by using an example. During actual application, the foregoing functions may be allocated to and completed by different functional modules according to requirements, that is, the internal structure of the apparatus is divided into different functional modules, to complete all or some of the foregoing described functions. In addition, the map display apparatus provided by the foregoing embodiments is based on the same concept as the map display method in the foregoing embodiments. For the specific implementation process, refer to the method embodiment, and the details are not described herein again.

Figure 8:
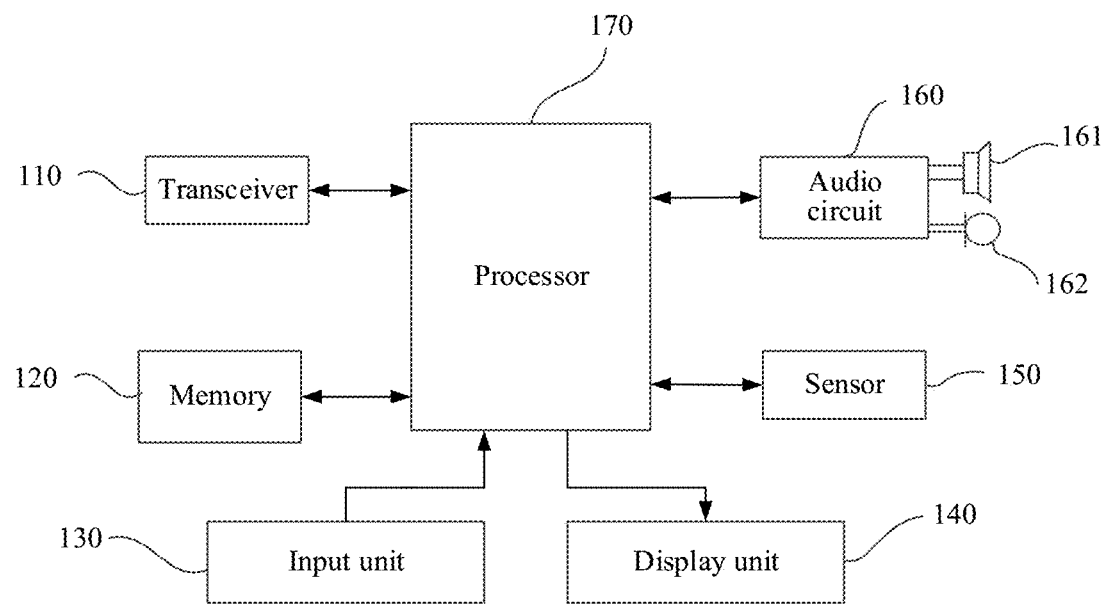
FIG. 8 is a schematic structural diagram of an in-vehicle multimedia terminal according to an embodiment of the present disclosure.

FIG. 8 is a schematic structural diagram of an in-vehicle multimedia terminal according to an embodiment of the present disclosure. The in-vehicle multimedia terminal may be configured to perform the map display method provided in the foregoing embodiments. Referring to FIG. 8, the in-vehicle multimedia terminal 800 includes:

components such as a transceiver 110, a memory 120 including one or more computer-readable storage mediums, an input unit 130, a display unit 140, a sensor 150, an audio circuit 160, and a processor 170 including one or more processing cores. A person skilled in the technology may understand that the structure of the in-vehicle multimedia terminal shown in FIG. 8 does not constitute a limitation to the in-vehicle multimedia terminal, and the in-vehicle multimedia terminal may include more or fewer components than those shown in the figure, or some components may be combined, or a different component deployment may be used.

The transceiver 110 may be configured to receive and transmit a signal in an information receiving/transmission process. The in-vehicle multimedia terminal 800 may communicate, through the transceiver 110, with another device located in a vehicle. Communication manners include but are not limited to a Bluetooth wireless communication manner, a Wi-Fi wireless communication manner and the like.

The memory 120 may be configured to store a software program and module. The processor 170 runs at least one instruction, at least one program, a code set or an instruction set stored in the memory 120, to implement various functional applications and data processing. The memory 120 mainly includes a program storage area and a data storage area. The program storage area may store an operating system, the at least one instruction, the at least one program, the code set, the instruction set, or the like. The data storage area may store data (for example, audio data) created according to use of the in-vehicle multimedia terminal 800.

The input unit 130 may be configured to receive input digit or character information, and generate a signal input related to the user setting and function control. Specifically, the input unit 130 may include a touch-sensitive surface and another input device. The touch-sensitive surface, which is also be referred to as a touchscreen or a touch panel, may collect a touch operation of a user on or near the touch-sensitive surface, and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 170. Moreover, the touch controller can receive and execute a command transmitted from the processor 170. In addition, the touch-sensitive surface may be a resistive, capacitive, infrared, or surface acoustic wave type touch-sensitive surface. In addition to the touch-sensitive surface, the input unit 130 may further include the other input device. Specifically, the other input device may include, but is not limited to, one or more of a physical keyboard, a functional key (such as a volume control key or a switch key).

The display unit 140 may be configured to display information entered by the user or information provided for the user, and various graphical user interfaces of the in-vehicle multimedia terminal 800. These graphical user interfaces may be formed by a graph, a text, an icon, a video, or any combination thereof. The display unit 140 may include a display panel. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 170 to determine a type of a touch event, and then the processor 170 provides corresponding visual output on the display panel according to the type of the touch event. Although, in FIG. 8, the touch-sensitive surface and the display panel are used as two separate parts to implement input and output functions, in some embodiments, the touch-sensitive surface and the display panel may be integrated to implement the input and output functions.

The in-vehicle multimedia terminal 800 may further include at least one sensor 150, such as an optical sensor. Specifically, the optical sensor may include an ambient light sensor. The ambient light sensor may adjust brightness of the display panel according to brightness of ambient light rays.

The audio circuit 160, a loudspeaker 161, and a microphone 162 may provide audio interfaces between the user and the in-vehicle multimedia terminal 800. The audio circuit 160 may convert received audio data into an electric signal and transmit the electric signal to the speaker 161. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 170 for processing. Then, the processor 170 transmits the audio data to, for example, another device in the vehicle by using the transceiver 110, or outputs the audio data to the memory 120 for further processing.

The processor 170 is the control center of the in-vehicle multimedia terminal 800, and is connected to various parts of the entire in-vehicle multimedia terminal by using various interfaces and wires. By running or executing the software program and/or module stored in the memory 120, and invoking data stored in the memory 120, the processor 170 performs various functions and data processing of the in-vehicle multimedia terminal 800, thereby performing overall monitoring on the in-vehicle multimedia terminal. Optionally, the processor 170 may include one or more processing cores. Preferably, the processor 170 may integrate an application processor and a modem. The application processor mainly processes an operating system, a user interface, an application program, and the like. The modem mainly processes wireless communication. It may be understood that the foregoing modem processor may not be integrated into the processor 170.

Specifically, in this embodiment, the display unit of the in-vehicle multimedia terminal may be a touchscreen display, and the processor 170 of the in-vehicle multimedia terminal may run the at least one instruction, the at least one program, the code set or the instruction set stored in the memory 120 to implement the map display method in the foregoing method embodiment.

In another exemplary embodiment, this embodiment of the present disclosure further provides a computer-readable storage medium. The storage medium stores at least one instruction, at least one program, a code set or an instruction set. The at least one instruction, the at least one program, the code set or the instruction set is loaded and executed by a processor of an in-vehicle multimedia terminal to implement the map display method according to the foregoing embodiments.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely exemplary embodiments of the present disclosure, but are not intended to limit the present disclosure. Any modification, equivalent replacement, or improvement derived within the spirit and principle of the present disclosure shall fall within the protection scope of the present disclosure.

What is claimed is:

1. A map display method, applied to a terminal having one or more processors and memory storing a plurality of programs to be executed by the one or more processors, the method comprising:
   obtaining a real scene image of a current location and target navigation data of navigation from the current location to a destination;
   determining, according to the current location and the target navigation data, virtual navigation prompt information to be overlaid in the real scene image;
   determining, according to a current device configuration parameter of a target device capturing the real scene image, a first location in the real scene image onto which the virtual navigation prompt information is projected;
   performing verification detection on the current device configuration parameter of the target device using a location error between the first location in the real scene image and a second location of a corresponding target object detected in real time in the real scene image; and
   overlaying the virtual navigation prompt information on the first location in real time in a case that the current device configuration parameter of the target device passes through the verification detection when the location error is less than a preset threshold, to obtain an augmented reality image used for performing map display.

2. The method according to claim 1, wherein the device configuration parameter comprises an extrinsic parameter and an intrinsic parameter, and the method further comprises:
   calculating, for a search granularity that is set for the extrinsic parameter, a cost function value of each search parameter value within a parameter value search range corresponding to a current search granularity, and determining a search parameter value having a minimum cost function value under the current search granularity;
   determining, based on the search parameter value obtained through the current search, a parameter value search range corresponding to a next search granularity, determining, according to the current search manner, a search parameter value having a minimum cost function value under the next search granularity, and deducing the rest by analogy, until a target search parameter value having a minimum cost function value under a minimum search granularity is obtained, wherein a granularity value of the next search granularity is less than that of the current search granularity; and
   determining the target search parameter value as a current extrinsic parameter of the target device.

3. The method according to claim 2, wherein the calculating a cost function value of each search parameter value within a parameter value search range corresponding to a current search granularity comprises:
   obtaining a point target object in the real scene image as the corresponding target object;
   determining, for each search parameter value and according to the search parameter value, the first location, in the real scene image, of virtual navigation prompt information matching the point target object;
   calculating a straight-line distance between the first location and the second location of the point target object, wherein the second location is a location of the point target object detected in the real scene image; and
   taking the straight-line distance as a cost function value of the search parameter value.

4. The method according to claim 2, wherein the calculating a cost function value of each search parameter value within a parameter value search range corresponding to a current search granularity comprises:
   obtaining a line target object in the real scene image;
   determining, for each search parameter value and according to the search parameter value, a fourth location, in the real scene image, of virtual navigation prompt information matching the line target object;
   calculating a normal distance between the fourth location and a fifth location of the line target object, wherein the fifth location is a location of the line target object detected in the real scene image; and
   taking the normal distance as a cost function value of the search parameter value.

5. The method according to claim 1, wherein the method further comprises:
   re-calibrating the device configuration parameter of the target device in a case that no target object is detected in a target image area, in the real scene image, having the first location as a center point; and performing verification detection on the re-calibrated device configuration parameter; and
   overlaying the determined virtual navigation prompt information in the real scene image of the current location according to the re-calibrated device configuration parameter in a case that the re-calibrated device configuration parameter passes through the verification detection.

6. The method according to claim 1, wherein the method further comprises:
   collecting statistics on an average value of the location error obtained within a preset time length;
   re-calibrating the device configuration parameter of the target device in a case that the average value is greater than the preset threshold;
   performing verification detection on the re-calibrated device configuration parameter; and
   overlaying the determined virtual navigation prompt information in the real scene image of the current location according to the re-calibrated device configuration parameter in a case that the re-calibrated device configuration parameter passes through the verification detection when the average value is less than the preset threshold.

7. The method according to claim 1, wherein the method further comprises:
   re-calibrating the device configuration parameter of the target device in a case that a target object is detected in a target image area, in the real scene image, having the first location as a center point and the location error is greater than the preset threshold;
   performing verification detection on the re-calibrated device configuration parameter; and
   overlaying the determined virtual navigation prompt information in the real scene image of the current location according to the re-calibrated device configuration parameter in a case that the re-calibrated device configuration parameter passes through the verification detection when the location error is less than the preset threshold.

8. The method according to claim 1, wherein the overlaying the virtual navigation prompt information on the first location comprises:
  determining, in a case that the virtual navigation prompt information comprises at least two pieces of virtual navigation prompt information, target navigation prompt information having a largest effect on current navigation in the at least two pieces of virtual navigation prompt information; and
  overlaying the target navigation prompt information in a manner different from that for other virtual navigation prompt information.

9. The method according to claim 1, wherein the overlaying the virtual navigation prompt information on the first location comprises:
  distinguishably displaying, in a case that the virtual navigation prompt information is lane line information, a virtual lane line of a current travelling lane and a virtual lane line of another lane on the first location, and marking a travelling range of the current travelling lane; or
  displaying a virtual road affiliated facility mark on the first location in a case that the virtual navigation prompt information is road affiliated facility information; or
  distinguishably displaying a virtual lane line of the current travelling lane and a virtual lane line of a target lane-change lane as well as another virtual lane line in a case that the virtual navigation prompt information is lane-change reminding information; or
  displaying a virtual point of interest mark of the current location on the first location in a case that the virtual navigation prompt information is point of interest information.

10. The method according to claim 1, wherein the corresponding target object is detected in the real scene image by selecting a target image area having the first location in the real scene image as the center point of the target image area and determining that a target object in the target image area matching the virtual navigation prompt information is the corresponding target object.

11. A terminal comprising one or more processors, memory coupled to the one or more processors and a plurality of programs stored in the memory that, when executed by the one or more processors, cause the terminal to perform a plurality of operations comprising:
  obtaining a real scene image of a current location and target navigation data of navigation from the current location to a destination;
  determining, according to the current location and the target navigation data, virtual navigation prompt information to be overlaid in the real scene image;
  determining, according to a current device configuration parameter of a target device capturing the real scene image, a first location in the real scene image onto which the virtual navigation prompt information is projected;
  performing verification detection on the current device configuration parameter of the target device using a location error between the first location in the real scene image and a second location of a corresponding target object detected in real time in the real scene image; and
  overlaying the virtual navigation prompt information on the first location in real time in a case that the current device configuration parameter of the target device passes through the verification detection when the location error is less than a preset threshold, to obtain an augmented reality image used for performing map display.

12. The terminal according to claim 11, wherein the device configuration parameter comprises an extrinsic parameter and an intrinsic parameter, and the plurality of operations further comprise:
  calculating, for a search granularity that is set for the extrinsic parameter, a cost function value of each search parameter value within a parameter value search range corresponding to a current search granularity, and determining a search parameter value having a minimum cost function value under the current search granularity;
  determining, based on the search parameter value obtained through the current search, a parameter value search range corresponding to a next search granularity, determining, according to the current search manner, a search parameter value having a minimum cost function value under the next search granularity, and deducing the rest by analogy, until a target search parameter value having a minimum cost function value under a minimum search granularity is obtained, wherein a granularity value of the next search granularity is less than that of the current search granularity; and
  determining the target search parameter value as a current extrinsic parameter of the target device.

13. The terminal according to claim 12, wherein the calculating a cost function value of each search parameter value within a parameter value search range corresponding to a current search granularity comprises:
  obtaining a point target object in the real scene image as the corresponding target object;
  determining, for each search parameter value and according to the search parameter value, the first location, in the real scene image, of virtual navigation prompt information matching the point target object;
  calculating a straight-line distance between the first location and the second location of the point target object, wherein the second location is a location of the point target object detected in the real scene image; and
  taking the straight-line distance as a cost function value of the search parameter value.

14. The terminal according to claim 11, wherein the plurality of operations further comprise:
  re-calibrating the device configuration parameter of the target device in a case that no target object is detected in a target image area, in the real scene image, having the first location as a center point; and performing verification detection on the re-calibrated device configuration parameter; and
  overlaying the determined virtual navigation prompt information in the real scene image of the current location according to the re-calibrated device configuration parameter in a case that the re-calibrated device configuration parameter passes through the verification detection.

15. The terminal according to claim 11, wherein the plurality of operations further comprise:
  collecting statistics on an average value of the location error obtained within a preset time length;
  re-calibrating the device configuration parameter of the target device in a case that the average value is greater than the preset threshold;
  performing verification detection on the re-calibrated device configuration parameter; and overlaying the determined virtual navigation prompt information in the real scene image of the current location according to the re-calibrated device configuration parameter in a case that the re-calibrated device configuration parameter passes through the verification detection when the average value is less than the preset threshold.

16. The terminal according to claim 11, wherein the plurality of operations further comprise:
re-calibrating the device configuration parameter of the target device in a case that a target object is detected in a target image area, in the real scene image, having the first location as a center point and the location error is greater than the preset threshold;
performing verification detection on the re-calibrated device configuration parameter; and
overlaying the determined virtual navigation prompt information in the real scene image of the current location according to the re-calibrated device configuration parameter in a case that the re-calibrated device configuration parameter passes through the verification detection when the location error is less than the preset threshold.

17. The terminal according to claim 11, wherein the overlaying the virtual navigation prompt information on the first location comprises:
determining, in a case that the virtual navigation prompt information comprises at least two pieces of virtual navigation prompt information, target navigation prompt information having a largest effect on current navigation in the at least two pieces of virtual navigation prompt information; and
overlaying the target navigation prompt information in a manner different from that for other virtual navigation prompt information.

18. The terminal according to claim 11, wherein the overlaying the virtual navigation prompt information on the first location comprises:
distinguishably displaying, in a case that the virtual navigation prompt information is lane line information, a virtual lane line of a current travelling lane and a virtual lane line of another lane on the first location, and marking a travelling range of the current travelling lane; or
displaying a virtual road affiliated facility mark on the first location in a case that the virtual navigation prompt information is road affiliated facility information; or
distinguishably displaying a virtual lane line of the current travelling lane and a virtual lane line of a target lane-change lane as well as another virtual lane line in a case that the virtual navigation prompt information is lane-change reminding information; or
displaying a virtual point of interest mark of the current location on the first location in a case that the virtual navigation prompt information is point of interest information.

19. The terminal according to claim 11, wherein the corresponding target object is detected in the real scene image by selecting a target image area having the first location in the real scene image as the center point of the target image area and determining that a target object in the target image area matching the virtual navigation prompt information is the corresponding target object.

20. A non-transitory computer readable storage medium storing a plurality of machine readable instructions in connection with a terminal having one or more processors, wherein the plurality of machine readable instructions, when executed by the one or more processors, cause the terminal to perform a plurality of operations including:
obtaining a real scene image of a current location and target navigation data of navigation from the current location to a destination;
determining, according to the current location and the target navigation data, virtual navigation prompt information to be overlaid in the real scene image;
determining, according to a current device configuration parameter of a target device capturing the real scene image, a first location in the real scene image onto which the virtual navigation prompt information is projected;
performing verification detection on the current device configuration parameter of the target device using a location error between the first location in the real scene image and a second location of a corresponding target object detected in real time in the real scene image; and
overlaying the virtual navigation prompt information on the first location in real time in a case that the current device configuration parameter of the target device passes through the verification detection when the location error is less than a preset threshold, to obtain an augmented reality image used for performing map display.

* * * * *